Aug. 16, 1966     F. A. CIANFLONE, JR     3,266,870

BYPASS CHEMICAL DISSOLVER WITH SLANTED-SLOT JET AGITATORS

Filed Aug. 15, 1963

INVENTOR.
FRANK A. CIANFLONE, JR.
BY
Wolfe, Hubbard, Voit & Osann
ATTYS 3,266,870
BYPASS CHEMICAL DISSOLVER WITH SLANTED-SLOT JET AGITATORS
Frank A. Cianflone, Jr., Waukegan, Ill., assignor to Stiles-Kem Sales Corporation, Zion, Ill., a corporation of Illinois
Filed Aug. 15, 1963, Ser. No. 302,363
1 Claim. (Cl. 23—271)

The present invention relates generally to chemical feeders, and more particularly to improvements in devices for the chemical treatment of water, which first form a chemical solution, and add the same in proportionate amounts to a main stream of flowing water.

A chemical feeder of the general type to which the present invention relates, is shown in Karlson Patent No. 2,998,979, and is one in which a saturated chemical solution is formed in what is known in the art as an "alum pot" by adding an amount of water to the surface of a supply of soluble dry chemical. A portion of the chemical dissolves to form a saturated solution above the solid chemical, and the solution is then drawn off and added in proportionate amounts to a stream of water requiring chemical treatment.

It is an object of the present invention to provide improved apparatus for forming a saturated chemical solution in which fresh water entering the "alum pot" is uniformly distributed in a manner which decreases the time required to produce a uniform solution at the draw-off point.

It is another object of the present invention to provide apparatus of the type described in which improved circulation of water tends to eliminate undissolved solids dispersed in the saturated solution, thereby eliminating the need for screens in the outlet line from the feeder. In conjunction with the above, it is a related object of the present invention to provide improved apparatus in which the saturated solution is more uniform throughout the solution area regardless of the level of the dry chemical, thereby providing a more precisely controllable system for chemically treating water.

A further object is to provide an improved method of achieving uniform and rapid solution of a water treating chemical in a by-pass type chemical feeding sytem.

These and other objects and advantages of the present invention will become more apparent to those skilled in the art, from a reading of the following detailed description in conjunction with the appended drawing, wherein.

Figure 1:
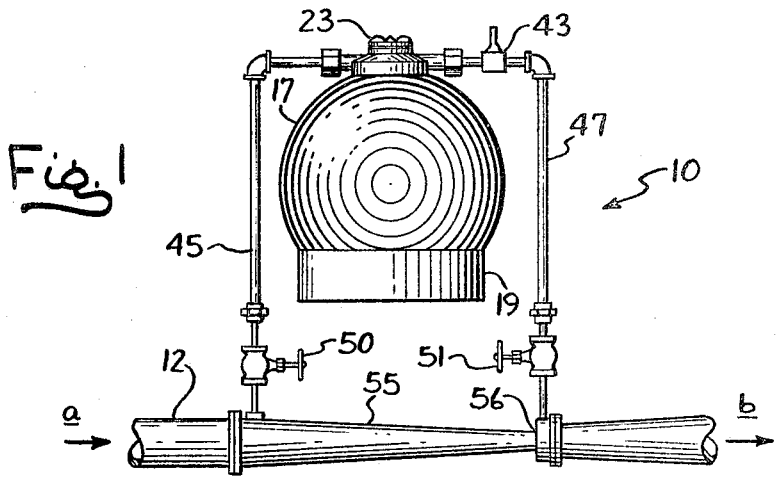
FIGURE 1 is an elevation of a water treating system constructed in accordance with the present invention.

While the invention hereinafter disclosed is susceptible of various modifications and alternative constructions, a particular illustrative embodiment has been shown in the drawing and will be hereinafter described in detail. It will be understood that there is no intention to limit the invention to the specific form disclosed, but, on the contrary, the intention is to cover all modifications, alternative constructions and equivalents falling within the spirit and scope of the invention as expressed in the appended claims.

With reference now more particularly to the drawing, and to FIG. 1, water treatment apparatus is there illustrated which exemplifies the present invention. The system as shown, comprises a main stream flow pipe 12 in which the water to be treated flows in a direction indicated by the arrows $a$ and $b$.

Figure 2:
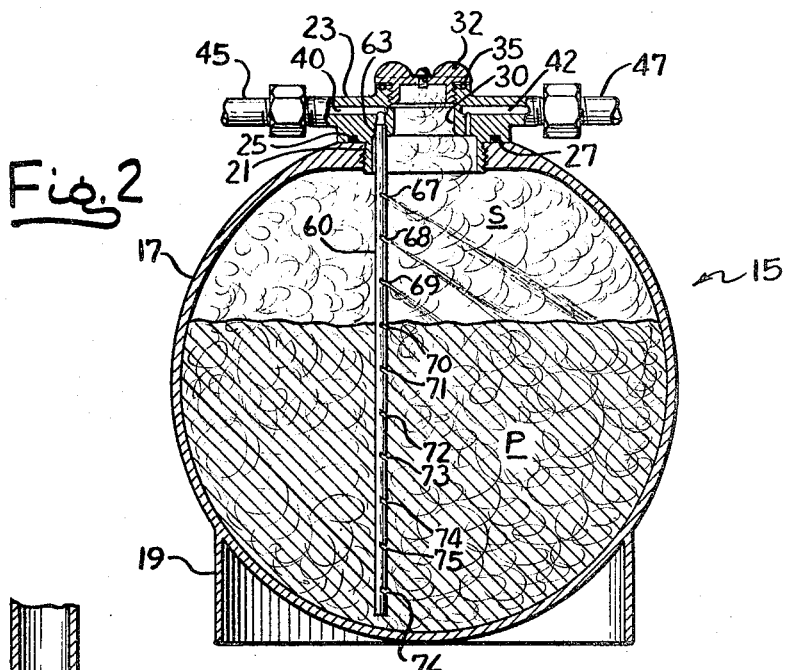
FIGURE 2 is an enlarged section of the "alum pot" of the FIGURE 1 system.

As previously indicated, chemical treatment of the water in accordance with the invention is effected by means of adding a predetermined amount of chemical solution to the water. Because many of the chemicals, e.g., the phosphates, conventionally employed in the treatment of water are most efficiently handled in a dry form, means must be provided for the forming of a saturated solution of the chemical before the same may be added to the water to be treated. Thus, referring to FIG. 2, a device known as an "alum pot" is illustrated, and identified by the numeral 15. It will be understood that the pot shown is exemplary only, and serves to illustrate the invention. A number of different "alum pot" constructions are available, numerous ones of which would serve for the purposes of the present invention.

The pot illustrated comprises a spherical container 17 preferably formed of a translucent material to permit observation of the contents thereof. The pot 17 is provided with a suitable cylindrical stand 19 which may be permanently attached to the pot shell or, for convenience, the pot may be removably seated on the stand 19. An opening is provided at the top of the pot at 21, and is threaded to receive a manifold head 23 which is screwed into the opening 21 to provide a water tight seal. In the present instance, a further seal is provided by means of an O-ring 25 which seats on a flat surface 27 provided at the top of pot 17.

A specified amount of dry chemical P is introduced into the pot through an opening 30 in the manifold 23. A cap 32, in the present case, resembling a wing nut is provided for securely closing the opening 30 during operation of the system. The cap is screwed into the opening which is threaded over a portion of its length and an O-ring 35 is provided to effect a secure water tight seal between the cap and manifold.

For the purposes of introducing fresh water into the pot 17, and drawing off saturated solution of chemical, the manifold plate is provided with an inlet port 40 and an outlet port 42. The inlet port is connected by suitable conduit 45 to the upstream side of the pipe 12. In a like manner, the outlet port 42 is connected to the downstream side of the pipe 12 by means of conduit 47.

In order to provide optimum flow control and thereby control the amount of chemical added to the fresh water stream, a pair of valves 50, 51 are provided on the inlet conduit 45 and the outlet conduit 47, respectively. These valves are sufficiently sensitive to provide an accurate ontrol over both the flow of fresh water into the "alum pot" and the quantity of saturated solution being drawn from the pot and added to the flow stream. Obviously they also provide means for stopping flow through the pot.

In order to form a chemically saturated solution in the pot 17, fresh water is added in the space above the level of the dry chemical P. This may be accomplished by initially opening the valve 50 so as to quickly fill the space (indicated by the letter S for the purposes of clarity) above the chemical with water. Because a certain amount of time will be required for the fresh water to become saturated with the soluble dry chemical, the valve 51 is initially opened only a small part of the way until sufficient time has passed for the water in the pot to become saturated. Once saturation has been achieved, the flow rate may be adjusted in order to provide an optimum flow of fresh water into the "alum pot" while at the same time drawing off the desired amount of saturated solution through outlet port 42. Line flow control throughout normal operation may be achieved with the insertion of a control valve such as needle valve 43 in one of the lines 45, 47.

In order to provide for flow of water through the pot in the direction desired, a restriction is provided in the main line 12 between the inlet conduit 45 and the outlet conduit 47 which creates a pressure differential across the inlet and outlet of the "alum pot" so as to direct the flow as desired. Thus, a venturi 55 is provided, converging in a direction towards the outlet conduit 47 and having a throat 56 of sufficient restriction to provide a pressure differential which is adequate to permit the required flow to be attained through accurate use of the valves 50, 51 for controlling flow.

Figure 3:
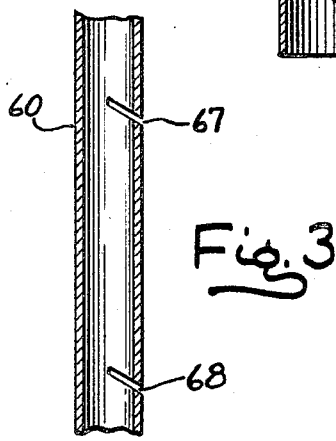
FIGURE 3 is a fragmentary section of an input spray tube shown in FIGURE 2.

A problem which is encountered in systems such as the one herein described is the inefficient formation of a saturated solution of chemical in the space S. It is necessary for the optimum operation of the system that a saturated solution be formed in sufficient quantities and of sufficient uniformity and homogeneity as to permit any reasonable quantity of the chemical solution so formed to be added to a water stream having a desired flow rate. The present invention accomplishes the efficient formation of a saturated solution with the provision of a fresh water injector, or spray tube, indicated at 60, and further shown in FIG. 3.

The tube 60 is fitted into a passage 63 which connects in the present instance to the inlet port 40 by press fitting the same therein, or by any other convenient means. The tube 60 extends vertically downward into the pot 17 to a point near the bottom thereof. In order that the fresh water added to the pot be efficiently dispersed for optimum use in forming a saturated solution, the tube 60 is so constructed that the fresh water is added at or near the level of the dry chemical in the pot at all times. Thus, fresh water is added under some pressure at the surface of the chemical where the flow of water from the tube 60 causes agitation of the liquid at the surface of the solid chemical, whereby the liquid becomes quickly saturated with the soluble chemical to form a saturated solution. In accomplishing this, the tube 60 is formed with a plurality of serially spaced slots 67–76 which extend from a point near the top of the pot to a point near the bottom thereof. Thus, as the level of the dry soluble chemical P drops from its initial high level in the pot, slots 67–76 are successively uncovered and the pressure of fresh water emanating from the slot closest to the level of the chemical causes the water to be discharged at or near that level regardless of where that level is. So as to provide more specific direction to the water flow, the slots 67–76 are canted or slanted downwardly a small amount from the horizontal. Thus a more positive direction of flow is attained, causing agitation at the chemical level which enhances the rate at which solution is formed.

It will now be apparent that with the fresh water being discharged at or near the level of the soluble chemical, the rate at which the chemical is taken into the solution and the solution becomes saturated is greatly increased and accordingly the amount of saturated solution available to be drawn off at the outlet port 42 for a given flow of water through the passage 12 is greatly increased.

I claim as my invention:

In a chemical feeder of the by-pass type, apparatus for forming a saturated chemical solution comprising a container connected into an unsaturated liquid supply system so as to receive by-pass liquid therefrom, said container having therein a supply of dry chemical having an exposed upper surface; a manifold head forming the top closure of said container and having inlet and outlet ports therein communicating with the interior of said container; means for supplying unsaturated by-pass liquid to said inlet port; a tube connected to said inlet port to receive said by-pass liquid therefrom, said tube extending downwardly from said inlet port and vertically through the body of dry chemical within said container and terminating adjacent the bottom portion of said container; said tube having a plurality of vertically spaced, downwardly slanted slots extending over the greater portion of the length thereof, the slots above the exposed upper surface of the dry chemical within said container adapted to spray said unsaturated by-pass liquid in a wide arch over a substantial portion of said exposed upper surface of said dry chemical to permit intimate contact between said liquid and said exposed upper surface to form a saturated solution, successive ones of said slots being uncovered by the dissolution of the dry chemical at the exposed upper surface thereof as said by-pass liquid is sprayed thereon so that said dissolution of said dry chemical at the exposed upper surface thereof is effected regardless of the level of said dry chemical in said container, following which said saturated by-pass liquid passes out to said liquid supply system through said outlet port.

References Cited by the Examiner

UNITED STATES PATENTS

| 588,418 | 8/1897 | Gaynor | 23—272.6 |
| 1,640,111 | 8/1927 | Clauson | 23—272.7 X |
| 2,067,328 | 1/1937 | Lux | 23—272.7 |
| 2,375,729 | 5/1945 | Caldwell | 23—271 |
| 2,375,730 | 5/1945 | Caldwell | 23—272.5 X |
| 2,536,361 | 1/1951 | Flanders | 23—272.7 |
| 2,611,648 | 9/1952 | Risher | 23—272.7 |
| 2,737,414 | 3/1956 | Weuzel | 239—318 X |
| 2,767,846 | 10/1956 | Schulse | 23—267 |
| 3,084,712 | 4/1963 | Brown | 23—272.7 X |
| 3,164,443 | 1/1965 | Watson | 23—267 |

FOREIGN PATENTS 9,085    4/1896    Great Britain.

NORMAN YUDKOFF, *Primary Examiner.*

S. EMORY, *Assistant Examiner.*